July 29, 1958  L. E. PUTMAN ET AL  2,845,199
CONTAINER
Filed Jan. 6, 1955  2 Sheets-Sheet 2
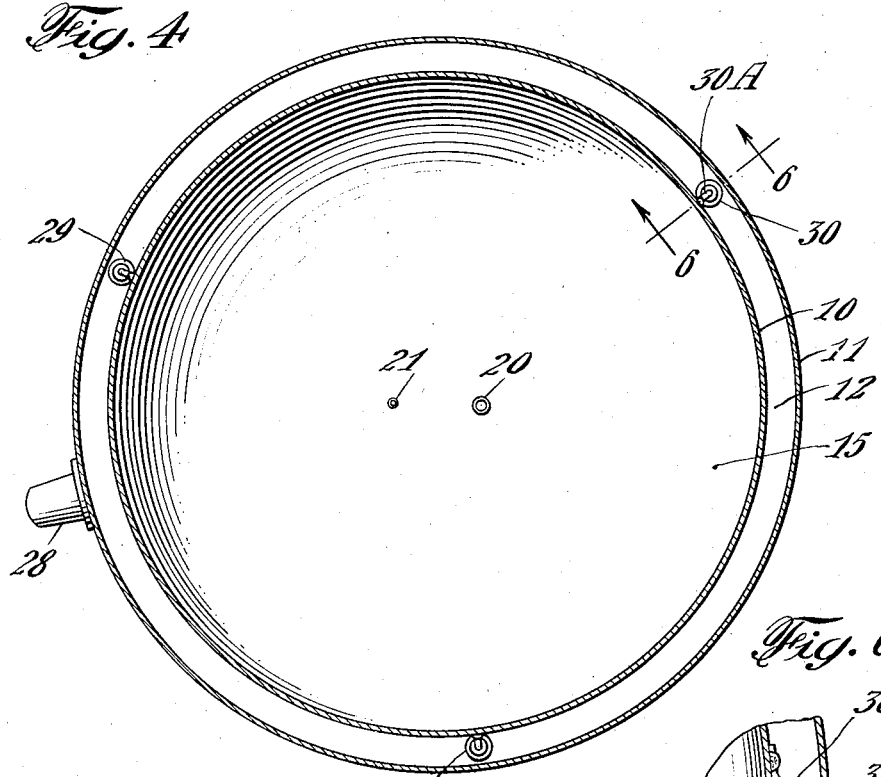
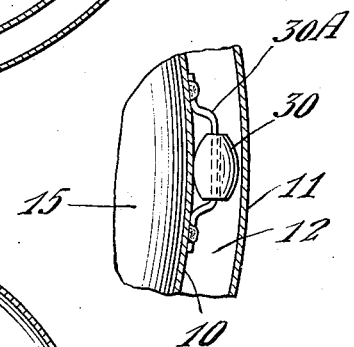
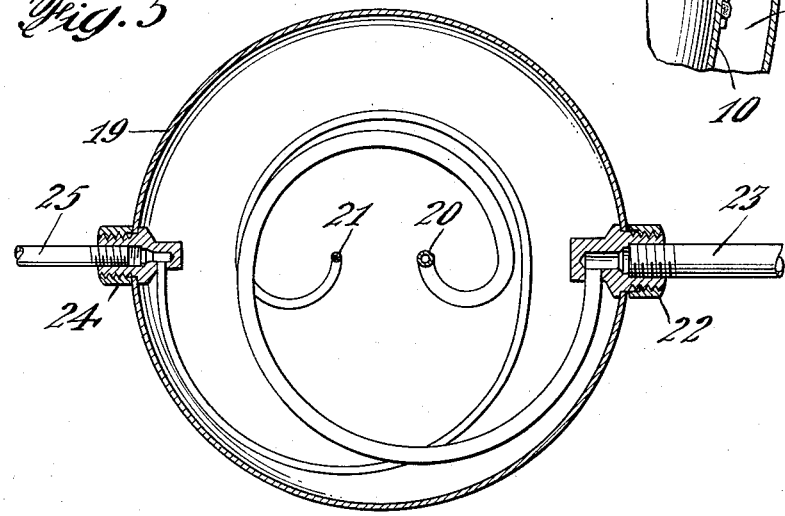

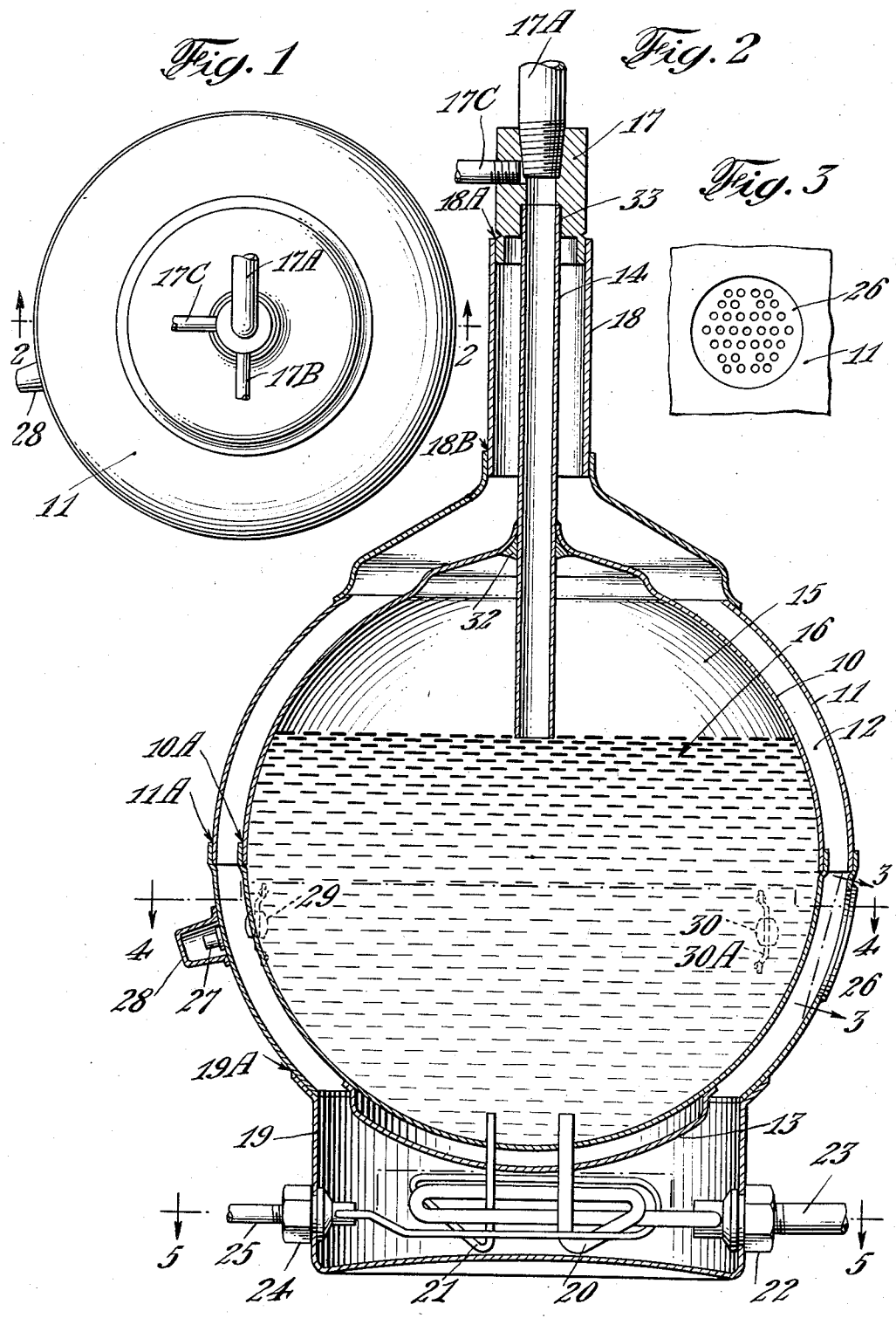

United States Patent Office 2,845,199
Patented July 29, 1958

2,845,199

CONTAINER

Laurel E. Putman, Livingston, N. J., and Robert E. Turner, Pittsburgh, Pa.; said Turner assignor to Mine Safety Appliances Company, Pittsburgh, Pa., a corporation of Pennsylvania, and said Putman assignor to Superior Air Products Company, Newark, N. J., a corporation of Delaware Application January 6, 1955, Serial No. 480,222

4 Claims. (Cl. 220—15)

The present invention relates to containers for volatile fluids and more particularly to a portable container for carrying and storing a volatile fluid such as liquid oxygen which must be maintained at a very low temperature.

The use of lightweight vacuum jacketed dewar vessels for the storage of liquid oxygen in aircraft oxygen breathing systems is a relatively new development. Heretofore, the forces acting upon such a vessel have been those associated with conventional piston-driven aircraft. With the advent of jet-propelled supersonic aircraft, the forces acting upon such a vessel have been greatly increased and the problem of providing a reliable container of this type has been greatly magnified. The problem has been primarily one of providing a supporting structure for the storage vessel itself. Among the principal causes of failure of the storage container are the vibratory and acceleration forces set up in a jet-propelled aircraft. Due to the vibratory frequencies set up in such aircraft, construction details involving joining of metals must take into consideration the fatigue stresses set up by the vibration over long periods of time.

The principal object of the invention has been to provide a novel and improved vacuum jacketed storage vessel for liquid oxygen and the like.

More particularly, it has been an object of the invention to provide a vacuum jacketed storage vessel for liquid oxygen and the like which, when loaded, is capable of withstanding the large forces due to acceleration and vibration of modern high speed aircraft and to provide a construction that will not fail under the fatigue stresses encountered during many hours of operation.

Other and further objects, features and advantages of the invention will become apparent from the following description of the invention.

The invention will now be described in greater detail with reference to the drawings, in which Fig. 1 is a plan view of a storage container constructed in accordance with the invention;

Fig. 2 is a vertical sectional view taken along the line 2—2 of Fig. 1;

Fig. 3 is a fragmentary view taken along the line 3—3 of Fig. 2;

Fig. 4 is a horizontal sectional view taken along the line 4—4 of Fig. 2;

Fig. 5 is a horizontal sectional view taken along the line 5—5 of Fig. 2; and

Fig. 6 is an enlarged fragmentary sectional view taken along the line 6—6 of Fig. 4.

The embodiment of the invention illustrated in the drawings comprises an inner vessel 10 surrounded by a vacuum jacket 11 providing a vacuum space 12 between the vessel 10 and the jacket 11. The inner vessel 10 is preferably generally spherical in shape to provide a maximum storage space with minimum weight and with minimum evaporation losses. The thickness of the vessel wall can be selected in accordance with the working pressure desired. Each of the vessel 10 and the jacket 11 are preferably made in two sections joined along pressure-tight sealing connections 10A and 11A, respectively. In accordance with well-known practice, the space 12 between the vessel 10 and the jacket 11 should be evacuated to a low absolute pressure. The outer surface of the vesesl 10 and the inner surface of the jacket 11 should be highly polished to minimize heat transfer due to radiation when the vacuum space 12 is evacuated. To assist in maintaining a low absolute pressure in the vacuum space 12, a material which is highly adsorbent at low temperatures may be held against the outer wall of the vessel 10 by means of an adsorbent pan 13.

The vessel 10 is suspended within the vacuum jacket 11 by means of a tubular inner neck 14. The neck 14 extends within the vessel 10 to provide a vapor space 15 within the vessel 10 and above the level of the liquid 16 contained in the vessel 10. The neck 14 provides the primary support for the vessel 10 and its construction and mode of attachment to the vessel 10 represent important features of the invention which will be discussed in greater detail hereinafter.

The inner neck 14 is supported at its upper end in a top fitting 17 which is in turn joined to the jacket 11 by means of an outer neck 18, a pressure-tight connection between the outer neck 18 and the fitting 17 being made at 18A and a like connection between the outer neck 18 and the jacket 11 being made at 18B. The outer neck 18 forms, in effect, an extension of the insulating jacket 11. An extension cup 19 is affixed to the lower end of the jacket 11 through a pressure-tight connection 19A and communicates with the vacuum space 12. The extension cup 19 provides additional space for access lines to the vessel 10. One such access line is a liquid drain line 20 which may be a coil of thin wall tubing provided with a conventional gas trap to prevent unnecessary heat transfer through boiling of liquid into the inner vessel 10. The liquid drain line 20 is preferably made from a low conductivity material to minimize heat transfer by conduction. An instrument line 21 is provided to permit determination of the liquid level in the vessel 10. The line 21 is preferably trapped and coiled in the same manner as the line 20 to minimize heat transfer.

The liquid drain line 20 terminates in the outer wall of the extension cup 19 in a fitting 22 which may be threaded to connect to an external vaporizer as by means of a pipe 23. The instrument line 21 similarly terminates at the outer wall of the extension cup 19 in a fitting 24 which may be threaded for connecting to external instruments as through a pipe 25.

Access to the inner vessel 10 may also be had through the fitting 17, the hollow interior of which communicates with the vessel 10 through the hollow tubular neck 14. For this purpose, the fitting 17 may be provided with three threaded holes adapted to receive pipes 17A, 17B and 17C. The pipe 17A might, for example, lead to a liquid level gage. The pipe 17B might lead to a pressure gage. The pipe 17C might be a pressure inlet for maintaining suitable delivery pressure in the vessel 10. The gas pressure supplied through the pipe 17C might be derived from a heat exchanger connected to the delivery pipe 23. Any one of the pipes, such as the delivery pipe 23, may be used for filling the vessel 10 with the liquid to be stored and dispensed.

The vacuum jacket 11 may be provided with a blow-out patch 26 (shown in detail in Fig. 3) to relieve excess pressure in the vacuum space 12 should liquid leak from the inner vessel 10 into the vacuum space 12.

The vacuum space 12 is initially evacuated through a tube 27 which is sealed off after evacuation is completed. The tube 27 is protected by means of a cap 28 carried on the outer surface of the jacket 11.

The inner vessel 10 is spaced from the outer jacket 11 by means of three equally spaced bumpers 29, 30 and 31 located below the median line of the vessel 10. While a larger number of bumpers can be provided, they are preferably equally spaced along the periphery of the vessel 10. The bumpers are preferably generally spherical in shape and are fastened to the outer wall of the inner vessel 10 by means of metal brackets which may be brazed or otherwise fastened to the vessel 10. The bumper 30 is shown enlarged in Fig. 6 and the bracket 30A, which carries the bumper 30, is clearly visible in this figure. The bumpers preferably do not fill the space between the outer wall of the vessel 10 and the inner wall of the jacket 11, a small clearance space being provided between the bumpers and the inner surface of the jacket 11, as shown in Fig. 6. This clearance is preferably about .01 to .025 inch. However, the brackets are preferably arranged to hold the bumpers in contact with the outer wall of the vessel 10, as is also shown in Fig. 6. The bumpers should be made of a resilient material which retains its resilience at low temperatures, is not a good conductor of heat, and does not contain occluded gases. So far as is presently known, materials of the polyfluorinated hydrocarbon type meet these three requirements most closely. Examples of suitable materials are a polymer of trifluorochloroethylene sold under the trade name Kel-F by the M. W. Kellogg Company and a tetrafluoroethylene polymer sold under the trade name Teflon by E. I. duPont de Nemours & Company. The spherical shape of the bumpers insures that only point to point contact can occur between the bumpers and the outer surface of the vessel 10 when the latter is in a generally vertical position, thus minimizing the amount of heat transferred from the jacket 11 to the vessel 10 by conduction.

The main support for the inner vessel 10 is provided by the inner neck 14, which is preferably silver soldered to the inner vessel 10 through a soldered joint 32, and to the fitting 17 through a soldered joint 33. The formation of these soldered joints is critical since, under the influence of horizontal acceleration forces, the entire weight of the filled inner vessel 10 acts in a manner so that the inner neck 14 is loaded in a cantilever fashion. This cantilever action is restrained by locating the bumpers 29, 30 and 31 in a plane below the median plane of the inner vessel 10 so that when the inner vessel 10 is subjected to acceleration stresses in any plane other than vertical the bumpers will prevent excessive deflection of the inner neck 14.

The upper end of the inner vessel 10 where it joins the neck 14 through the soldered joint 32 is preferably generally conical in cross-section and is dimensioned relative to the outer wall of the neck 14 so that solder will flow by capillary attraction into the space between the neck 14 and the upper end of the vessel 10, forming in this space a joint of capillary thickness. As shown in Fig. 2, the lower end of the joint 32 is preferably enlarged to maximize the area of contact between the neck 14 and the soldered joint 32 and between the vessel 10 and the soldered joint 32.

While the vessel 10 is frequently made of Everdur, the strength of the assembly can be greatly increased if the neck 14 is made from an austenitic type stainless steel. In such case the soldered joint 32 should be made from a low melting point silver solder in order to avoid formation of an intermetallic crystalline structure which would be prone to stress fatigue, cracking and failure. The soldered joint 33 between the neck 14 and the tube fitting 17 is also preferably a low melting point silver solder.

In assembling the container, the top fitting 17 is silver brazed to the inner neck 14 prior to slipping the top fitting 17 through the outer neck 18 for final assembly. By proceeding in this manner the inner neck 14 may be silver brazed at both of its critical junctures, the joint 32 with the inner vessel 10, and the joint 33 with the top fitting 17. The use of high strength silver solder joints 32 and 33 greatly increases the capacity of the container for high stress service. Furthermore, the shape of the joint 32, i. e., capillary thickness upper portion and wide lower portion, is also important in providing high stress capacity. The plastic type bumpers 29, 30 and 31 act to dampen any excessive vibration set up by acceleration forces.

While the invention has been described in connection with a particular embodiment thereof and in a particular use, various modifications thereof will occur to those skilled in the art without departing from the spirit and scope of the invention, as set forth in the appended claims. For example, it will be evident that the container is useful for volatile liquids other than liquid oxygen, and that the high stress capacity of the container renders it useful for classes of service other than in high speed aircraft. Thus, the container is useful for a variety of portable installations where breakage resistance is significant.

What is claimed is:

1. A container for liquid oxygen and the like, comprising an inner vessel, an insulating jacket surrounding the inner vessel and defining an evacuated insulation space between said vessel and said jacket, said jacket having a hollow neck portion, inlet and outlet connections communicating with said vessel, a supporting fitting affixed to said jacket within said neck portion thereof, a tubular member affixed adjacent one end thereof to said fitting and extending into said vessel, said member being affixed to said vessel for suspending the latter within said jacket, a plurality of generally spherical flexible bumpers, and bracket means for mounting said bumpers on the outer wall of said vessel within said insulation space and in a plane below the median plane of said vessel, said bumpers being substantially equally spaced around the periphery of said vessel and being arranged so as to be in contact with the outer wall of said vessel but slightly spaced from the inner wall of said jacket when said vessel is in a vertical position to prevent excessive motion of said vessel relative to said jacket.

2. A container for liquid oxygen and the like, comprising an inner vessel, an insulating jacket surrounding the inner vessel and defining an evacuated insulation space between said vessel and said jacket, said jacket having a hollow neck portion, inlet and outlet connections communicating with said vessel, a supporting fitting affixed to said jacket within said neck portion thereof, a tubular member affixed adjacent one end thereof to said fitting and extending into said vessel, said member being affixed to said vessel for suspending the latter within said jacket, three generally spherical flexible bumpers, and bracket means for mounting said bumpers on the outer wall of said vessel within said insulation space and in a plane below the median plane of said vessel, said bumpers being substantially equally spaced around the periphery of said vessel and being arranged so as to be in contact with the outer wall of said vessel but slightly spaced from the inner wall of said jacket when said vessel is in a vertical position to prevent excessive motion of said vessel relative to said jacket.

3. A container for liquid oxygen and the like, comprising a generally spherical metallic inner vessel having a generally conical neck portion at the upper end thereof defining an opening into said vessel, a metallic insulating jacket surrounding the inner vessel and defining an evacuated insulation space between said vessel and said jacket, said jacket having a hollow neck portion, inlet and outlet connections communicating with said vessel, a supporting fitting affixed to said jacket within said neck portion thereof, a metallic tubular member affixed adjacent one end thereof to said fitting by means of a hard-soldered joint and extending into said vessel through said opening, said member being affixed to the conical portion of said vessel by means of a hard-soldered joint for suspending the latter within said jacket, the hard-soldered joint between said member and said vessel being of capillary thickness adjacent the upper end of the neck portion of said vessel and having a wide base, a plurality of generally spherical flexible bumpers, and bracket means for mounting said bumpers on the outer wall of said vessel within said insulation space and in a plane below the median plane of said vessel, said bumpers being substantially equally spaced around the periphery of said vessel and being arranged so as to be in contact with the outer wall of said vessel but slightly spaced from the inner wall of said jacket when said vessel is in a vertical position to prevent excessive motion of said vessel relative to said jacket.

4. A container for liquid oxygen and the like, comprising a generally spherical metallic inner vessel having a generally conical neck portion at the upper end thereof defining an opening into said vessel, a metallic insulating jacket surrounding the inner vessel and defining an evacuated insulation space between said vessel and said jacket, said jacket having a hollow neck portion, inlet and outlet connections communicating with said vessel, a supporting fitting affixed to said jacket within said neck portion thereof, a metallic tubular member silver brazed adjacent one end thereof to said fitting and extending into said vessel through said opening, said member being silver brazed to the conical portion of said vessel for suspending the latter within said jacket, the silver brazed joint between said member and said vessel being of capillary thickness in the region of the upper end of said conical portion and having a wide base, a plurality of generally spherical flexible bumpers, and bracket means for mounting said bumpers on the outer wall of said vessel within said insulation space and in a plane below the median plane of said vessel, said bumpers being substantially equally spaced around the periphery of said vessel and being arranged so as to be in contact with the outer wall of said vessel but slightly spaced from the inner wall of said jacket when said vessel is in a vertical position to prevent excessive motion of said vessel relative to said jacket.

References Cited in the file of this patent

UNITED STATES PATENTS

| | | |
|---|---|---|
| 1,033,398 | Heylandt | July 23, 1912 |
| 1,598,149 | Mott | Aug. 31, 1936 |
| 2,113,060 | Sandberg | Apr. 5, 1938 |
| 2,144,820 | Thomas | Jan. 24, 1939 |
| 2,396,459 | Dana | Mar. 12, 1946 |
| 2,453,930 | Paul | Nov. 16, 1948 |

FOREIGN PATENTS

| | | |
|---|---|---|
| 12,358 | Great Britain | A. D. 1910 |
| 143,365 | Great Britain | May 27, 1920 |